Feb. 28, 1967   R. E. REASON ET AL   3,307,100
SINE-COSINE RESOLVER

Filed Oct. 28, 1964                    2 Sheets-Sheet 1

United States Patent Office 3,307,100
Patented Feb. 28, 1967

3,307,100
SINE-COSINE RESOLVER
Richard E. Reason, Leicester, and Brian Wilfred Barringer, Twickenham, England, assignors, by mesne assignments, to The Rank Organisation Limited, London, England, a British company
Filed Oct. 28, 1964, Ser. No. 407,254
5 Claims. (Cl. 323—75)

The invention relates to apparatus for providing electrical signals, and is concerned especially, but not exclusively, with apparatus for providing an electrical signal which is the product of an independently variable electrical quantity and a quantity dependent on the angle of rotation of a shaft.

The invention consists in an apparatus for providing an electrical signal, comprising a deformable member arranged for being deflected by deflection means, transducer means being associated with the deformable member, the arrangement being such that an electrical parameter of the transducer means is varied in dependence on the degree of deformation of the deformable member by the deflection means.

Preferably, the deformable member comprises a resilient deflectable beam. Advantageously, the beam is arranged as a cantilever.

The transducer means may be in the form of strain-sensitive resistance means. The strain-sensitive resistance means may be in the form of piezo-resistive transducers. Advantageously, the strain-sensitive resistance means comprise a pair of similar piezo-resistive elements disposed at the same region of the deformable member but on opposite sides thereof, whereby the elements undergo equal and opposite changes in their resistance values on deflection of the deformable member.

The deflection means may comprise a rotatable member having a surface which engages the deformable member. The rotatable member may be a cam.

The cam may have a cylindrical surface, eccentric to the axis of rotation of the cam, for engaging the deformable member. Alternatively, the cam may be a face cam engaging the deformable member by an end face. Preferably, the said end face is a plane face set at an angle to the axis of rotation of the cam, whereby to act on the deformable member in the manner of a swashplate. Advantageously, the deformable member is so arranged that the radius at which it engages the said end face of the cam can be changed, whereby to change the degree to which the deformable member is deflected by the full throw of the cam.

More than one deformable member, with associated transducer means may be provided for deflection by the deflecting means. Advantageously, two deformable members are provided, their disposition relative to the deflection means being such that they are deflected with a 90° phase difference.

Figure 1:
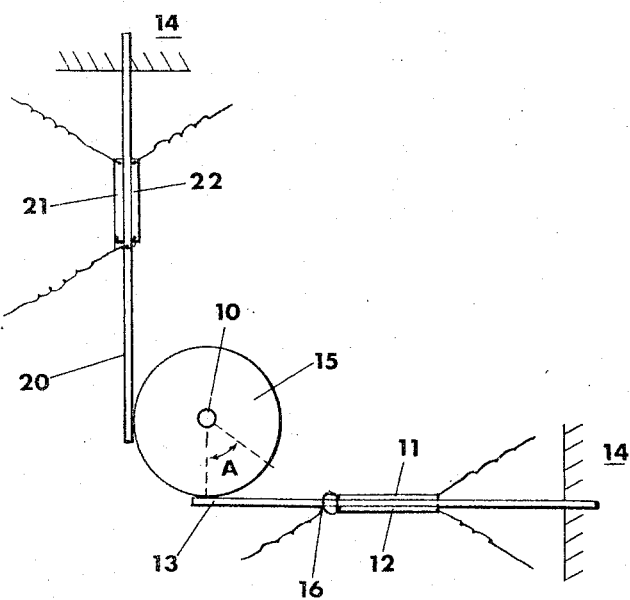
Figure 2:
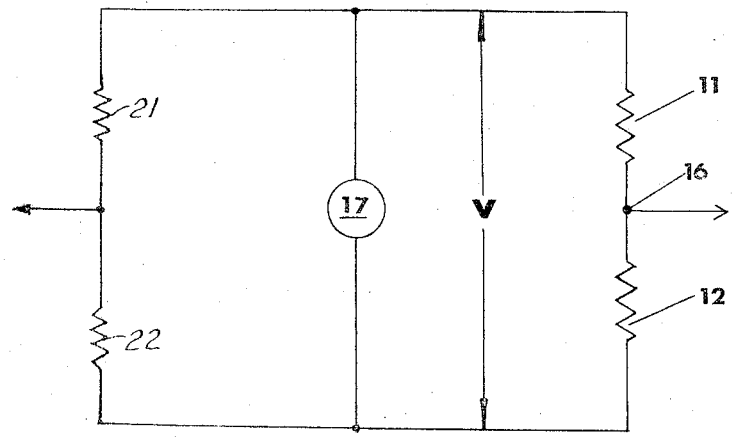
Figure 3:
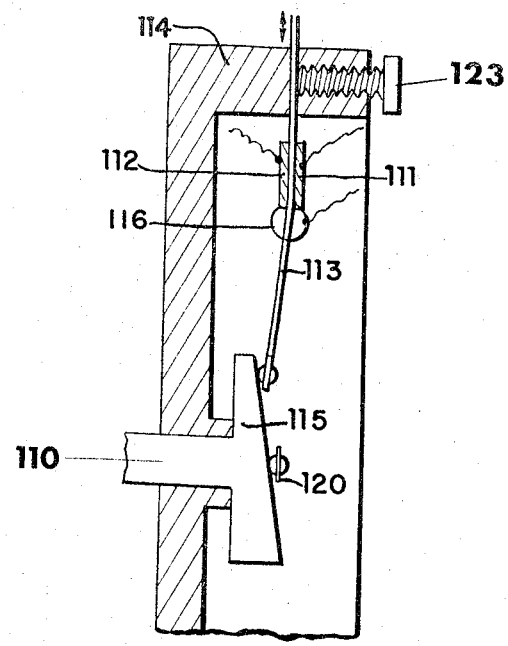
Figure 4:
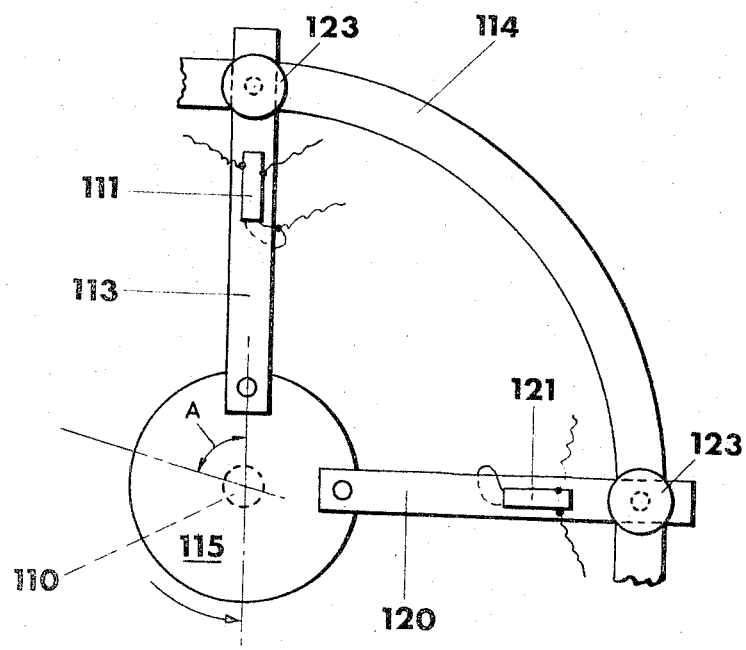

In order to make the invention clearly understood, reference will now be made to the accompanying diagrammatic drawings which are given by way of example and in which:

FIGURE 1 is a sectional elevation of the apparatus;
FIGURE 2 is a circuit diagram illustrating the operation of the apparatus shown in FIGURE 1;
FIGURE 3 is a fragmentary sectional elevation of a modified embodiment of the apparatus; and
FIGURE 4 is a fragmentary end view of the apparatus of FIG. 3.

Referring to FIGURES 1 and 2 of the drawings, an apparatus for providing an electrical signal which is the product of an electrical quantity in the form of a signal voltage V multiplied by the sine of an angle A comprises strain-sensitive resistance means in the form of two piezo-resistive element 11 and 12 mounted on either side of a deformable member, which is in the form of a thin beam 13, rigidly supported in cantilever manner in a housing 14 of the apparatus. The elements 11 and 12 are disposed at the same region of the thin beam 13, but on opposite faces thereof, and are connected in series.

Deflection means in the form of a circular, rotatable cam 15, eccentrically mounted on a rotatable shaft 10, engage the end of the thin beam 13.

A second beam 20, with similar piezo-resistive elements 21 and 22, set in the housing 14 as a cantilever, is arranged at 90° rotational displacement about the axis of the shaft 10, for a purpose to be described hereinafter.

In operation, the end of the beam 13 is made to move in a predetermined cyclic manner under the control of the rotatable cam 15, so that the resistance of each element 11 and 12 is proportional to the sine of the angle A through which the rotatable cam 15 has turned. With deflection of the beam 13, the resistance of the upper element 11 is changed in one sense, while the resistance of the lower element 12 is changed in the opposite sense. Consequently, the output available at the point 16 between the two resistances 11 and 12 is proportional to the sine of the angle A, by subtraction.

Referring to FIGURE 2, the independently variable electrical signal V is applied to the elements 11 and 12 from a signal source 17. An output proportional to V sin A is desired, and by the arrangement shown in FIGURES 1 and 2 the output at the point 16 becomes proportional to V sin A.

If it is desired to obtain a further output proportional to V cos A, the arrangement including the elements 21 and 22 of the second beam 20 similarly connected will yield the desired result.

The embodiment of FIGURES 3 and 4 is generally similar to that of FIGURES 1 and 2. In this embodiment, strain-sensitive resistance means are provided, which are in the form of two piezo-resistive elements 111 and 112 mounted on either side of a deformable member, which is in the form of a thin beam 113, rigidly supported in a housing 114 of the apparatus. The elements 111 and 112 are disposed at the same region of the thin beam 113, and are connected in series.

Deflection means in the form of a circular, rotatable face cam 115 are provided, the cam having a plane surface set at an angle to the axis of rotation of its shaft 110. The said surface engages the end of the thin beam 113 in the manner of a swash-plate.

A second beam 120, with similar elements 121 and 122, set in the housing 114 as a cantilever, is arranged at 90° rotational displacement from the beam 113 about the axis of the shaft 110, and serves the same purpose as the beam 20 in the embodiment of FIGURES 1 and 2.

The beams 113 and 120 are held in the housing 114 by screws 123. If these screws are loosened, the beams 113 and 120, independently of each other, may be moved in their axial directions, whereby to vary the radius at which the tip of each beam engages the swash-plate surface of the cam 115. Accordingly, precise mechanical control of the degree to which each beam is deflected by full throw of the cam 115, can be effected, the degree of deflection controlling the maximum amplitude of signal variation enabled by the apparatus.

Modifications of the embodiments described above are possible. For example, in the embodiment of FIGURES 1 and 2 the cam 15 need not be circular; it may have any shape capable of varying the elements 11 and 12 in the desired way, or may be replaced by other actuating means. Similarly, in the embodiment of FIGURES 3 and 4, the surface of the face cam 115 need not be flat. In both embodiments, the beams need not be cantilevers, but may be supported at their ends and each depressed by a linkage at a suitable point. Furthermore, instead of piezo-resistive elements, other transducers may be used, and when the variable parameter of such transducers is a resistance parameter the resistances of the elements may be made to follow predetermined sequences of values other than ones proportional to the sine or cosine of an angle, and may be disposed in ways other than the one shown in the drawings and hereinabove described, or several sets of transducer elements may be provided on one beam.

The apparatus may be used as a replacement for resolvers, sine/cosine potentiometers, linear variometers, multiple phase signal sources and function generators and multipliers.

One of the main advantages of the apparatus according to the present invention is that there is no physical frictional contact between the electrical elements and the moving parts of the apparatus. A further advantage is that the apparatus is able to handle direct current signals, low frequency signals, and also high frequency signals, from the signal source.

What is claimed is:

1. A sine-cosine resolver comprising
   a rotatable shaft,
   a cam mounted on said shaft, said cam having a camming surface,
   first and second deformable beams,
   first and second means for fixedly supporting said first and second deformable beams, respectively, at one end thereof,
   said first and second beams extending to and engaging said camming surface at the other ends thereof at two points of contact which are displaced from each other on said camming surface by 90 degrees,
   first, second, third and fourth transducers having an electrical parameter that varies with the strain thereon,
   means mounting said first and second transducers on opposing sides of said first deformable beam whereby the electrical parameters of said first and second transducers vary in opposite directions as said first beam is deformed,
   means mounting said third and fourth transducers on opposing sides of said second deformable beam whereby the electrical parameters of said third and fourth transducers vary in opposite directions as said second beam is deformed,
   a source of electrical signals,
   means connecting said first and second transducers in series across said source of signals,
   means connecting said second and third transducers in series across said source of signals,
   and first and second output leads, said first output lead being connected at one end between said first and second transducers and said second output lead being connected at one end between said third and fourth transducers.

2. A resolver as claimed in claim 1 wherein said camming surface is round and said cam is eccentrically mounted on said rotatable shaft.

3. A resolver as claimed in claim 2 wherein said first, second, third and fourth transducers are strain-sensitive resistors.

4. A resolver as claimed in claim 1 wherein said cam is mounted on the end of said rotatable shaft and said camming surface is a flat surface disposed in a plane which is not normal to the axis of rotation of said shaft.

5. A resolver as claimed in claim 4 wherein said first, second, third and fourth transducers are strain-sensitive resistors.

References Cited by the Examiner

UNITED STATES PATENTS

| 2,546,155 | 3/1951 | Haber et al. | 73—88.5 X |
|---|---|---|---|
| 2,598,812 | 6/1952 | Marco et al. | |
| 2,712,645 | 7/1955 | Keene | 338—6 X |
| 2,789,427 | 4/1957 | Brier | 73—88.5 X |
| 2,880,409 | 3/1959 | Gallentine | 338—6 X |
| 2,925,573 | 2/1960 | Brown et al. | 338—47 |
| 3,023,627 | 3/1962 | Geyling. | |
| 3,049,685 | 8/1962 | Wright. | |
| 3,161,061 | 12/1964 | Ames. | |

ANTHONY BARTIS, *Primary Examiner.*

RICHARD M. WOOD, *Examiner.*

W. D. BROOKS, *Assistant Examiner.*